(12) United States Patent
Li et al.

(10) Patent No.: US 11,784,399 B2
(45) Date of Patent: Oct. 10, 2023

(54) DUAL-BAND VERY LOW FREQUENCY ANTENNA

(71) Applicant: Anhui University, Hefei (CN)

(72) Inventors: Yingsong Li, Hefei (CN); Chenwei Zhang, Harbin (CN)

(73) Assignee: Anhui University, Hefei (CN)

( * ) Notice: Subject to any disclaimer, the term of this patent is extended or adjusted under 35 U.S.C. 154(b) by 11 days.

(21) Appl. No.: 17/827,669

(22) Filed: May 28, 2022

(65) Prior Publication Data
US 2023/0246329 A1   Aug. 3, 2023

(30) Foreign Application Priority Data

Jan. 28, 2022 (CN) .......................... 202210106150.5

(51) Int. Cl.
*H01Q 1/36* (2006.01)
*H01Q 1/38* (2006.01)
*H01Q 1/50* (2006.01)

(52) U.S. Cl.
CPC .............. *H01Q 1/364* (2013.01); *H01Q 1/38* (2013.01); *H01Q 1/50* (2013.01)

(58) Field of Classification Search
CPC ............ H01Q 1/364; H01Q 1/38; H01Q 1/50; H10N 30/00; H10N 30/85; H04B 1/04
See application file for complete search history.

(56) References Cited

U.S. PATENT DOCUMENTS

| | | | |
|---|---|---|---|
| 2015/0255871 A1* | 9/2015 | Baringer | H01Q 1/48 |
| | | | 29/25.35 |
| 2019/0097119 A1* | 3/2019 | Kemp | H04B 1/04 |
| 2021/0288403 A1* | 9/2021 | Hassanien | H01Q 1/50 |

* cited by examiner

*Primary Examiner* — David E Lotter
(74) *Attorney, Agent, or Firm* — Westbridge IP LLC

(57) ABSTRACT

Disclosed is a dual-band very low frequency antenna, which comprises positive and negative electrodes, silicon substrates, piezoelectric material units, stress-electromagnetic conversion material units and an insulator. The piezoelectric material units are arranged between the positive and negative electrodes; the stress-electromagnetic conversion material units and the silicon substrates are respectively arranged at both ends of the positive and negative electrodes. The positive and negative electrodes are used for driving the piezoelectric material units; the piezoelectric material units are used for generating flutter and conducting the flutter to the stress-electromagnetic conversion material units; the stress-electromagnetic conversion material units are used for converting vibration waves generated by flutter into electromagnetic wave radiation. The application is a dual-band very low frequency antenna, and the size is far smaller than that of the traditional low-frequency antenna, and the air-water interconnection can be realized.

6 Claims, 2 Drawing Sheets

DUAL-BAND VERY LOW FREQUENCY ANTENNA

CROSS-REFERENCE TO RELATED APPLICATIONS

This application claims priority to Chinese Patent Application No. 202210106150.5, filed on Jan. 28, 2022, the contents of which are hereby incorporated by reference.

TECHNICAL FIELD

The application belongs to the field of multi-band antennas and antenna miniaturization, and in particular to a dual-band very low frequency antenna.

BACKGROUND

A conventional very low frequency antenna is an important part of underwater communication and detection, terrestrial communication and detection, an over-the-horizon radar, and even the main part of underwater communication and detection. It is mainly used in the fields of global monitoring, underground communication, prospecting and underwater communication and detection. However, the conventional very low frequency antenna is similar in size and wavelength, and its length is several kilometers or even tens of kilometers, which severely limits the application of very low frequency antenna in underwater, single soldier communication and other aspects. In recent years, the application of very low frequency antenna in medicine has attracted the interest of scholars at home and abroad. Meanwhile, very low frequency antenna can be used as human communication and one of the main ways of interconnection in the future. The demand for miniaturization of very low frequency antenna is increasing. Conventional very low frequency antennas are mainly made of thin wires or enameled wires, which are either too heavy or too long to be deployed flexibly.

In recent years, with the demands of very low frequency personal communication, medical communication, medical monitoring, underwater communication and the integration of air, space and sea, the design of very low frequency antenna is developing towards miniaturization, light weight and chip. It is expected that very low frequency antenna could be installed on mobile devices, automobiles, underwater vehicles, single soldier backpack equipment, frogman communication equipment and aerospace equipment, so as to realize the interconnection of multi-domain communication and wide-area or multi-domain detection. However, the conventional very low frequency antenna is mainly designed with thin wires or long wires, whose length is similar to the wavelength of resonant frequency. Although the antenna is large in size, its efficiency and gain are not high. Meanwhile, the design with long wires cannot meet the actual needs of underwater, single soldier backpack, aerospace equipment, medical monitoring and body communication; moreover, long wires are limited by the installation environment, and cannot realize portable design and miniaturization.

SUMMARY

At present, aiming at the problems of miniaturization, single frequency band, large volume and size of very low frequency, the objective of the present application is to propose a dual-band very low frequency antenna to realize miniaturization design, and its performance is superior to that of the traditional very low frequency antenna with the same size, and the designed very low frequency acoustic excitation antenna has polarization controllability.

In order to achieve the above objectives, the present application provides the following scheme: a dual-band very low frequency antenna, including:
 positive and negative electrodes, silicon substrates, piezoelectric material units, stress-electromagnetic conversion material units and an insulator;
 the piezoelectric material units are arranged between the positive and negative electrodes;
 the stress-electromagnetic conversion material units and that silicon substrates are respectively arranged at both ends of the positive and negative electrodes;
 the positive and negative electrodes are used for driving the piezoelectric material units;
 the piezoelectric material units are used for generating flutter and conducting the flutter to the stress-electromagnetic conversion material units; and
 the stress-electromagnetic conversion material units are used for converting vibration waves generated by flutter into electromagnetic wave radiation.

Preferably, the dual-band very low frequency antenna, wherein
 the positive and negative electrodes include a first positive and negative electrodes and a second positive and negative electrodes;
 the silicon substrates include a first silicon substrate and a second silicon substrate;
 the piezoelectric material units include a first piezoelectric material unit and a second piezoelectric material unit;
 the stress-electromagnetic conversion material units include a first stress-electromagnetic conversion material unit and a second stress-electromagnetic conversion material unit; and
 the insulator is arranged between the first silicon substrate, the first positive and negative electrodes, the first piezoelectric material unit and the second silicon substrate, the second positive and negative electrodes and the second piezoelectric material unit.

Preferably, the positive electrodes of the first positive and negative electrodes and the second positive and negative electrodes are connected with the positive electrode of the power supply and have the same voltage;
 the negative electrodes of the first positive and negative electrodes and the second positive and negative electrodes are connected with the negative electrode of the power supply.

Preferably, the positive electrodes of the first positive electrode and the positive electrode of the second positive electrode are in the same plane, while the negative electrode is not in the same plane.

Preferably, the thickness of the first piezoelectric material unit is different from that of the second piezoelectric material unit.

Preferably, the first piezoelectric material unit and the second piezoelectric material unit are piezoelectric material unit sheets with different thicknesses, and shapes of the piezoelectric material unit sheets are one of rectangle, circle and polygon.

Compared with the prior art, the application has the following beneficial effects:

When the dual-band very low frequency antenna designed by the application transmits signals, the piezoelectric material unit is excited by the voltage to make the piezoelectric material unit sheet generate flutter, and the flutter of the piezoelectric material unit sheet is transmitted to the stress-electromagnetic conversion material unit, so that the flutter caused by the voltage is converted into electromagnetic waves. Because the thickness of the piezoelectric sheets used in the application is different and the same voltage is used for excitation, two different resonant frequencies will be generated. By designing different voltages to excite the piezoelectric sheets, the design of dual-band and multi-band very low frequency antennas can be realized. According to the application, a piezoelectric material unit sheet excited by voltage is used to generate flutter, and the flutter is transmitted to the stress-electromagnetic conversion material unit, and the stress-electromagnetic conversion material unit converts the frequency of the flutter into the frequency of electromagnetic waves, and radiates the electromagnetic signals. The designed dual-band very low frequency antenna can control the resonant frequency by controlling the thickness of the piezoelectric material unit sheet of metamaterial, so that the frequency could be adjusted. In addition, due to the existence of voltage excitation and the use of piezoelectric material units, the size of acoustic excitation antenna with the same size is reduced by 4-5 orders of magnitude compared with that of conventional antenna, and the existence of piezoelectric characteristics further reduces the size of antenna. Moreover, an insulator is used to separate the two piezoelectric material units and the silicon substrate, thus realizing the independent design of the two frequencies. The antenna designed by the application is very small, which is convenient to be installed in mobile equipment, backpack equipment, aerospace equipment and the like, effectively breaking through the problem that the conventional very low frequency antenna has a single frequency and is difficult to realize multi-band design. Moreover, it not only greatly reduces the volume and size of the equipment, but also reduces the cost and weight of the equipment, greatly promotes the wide application of very low frequency and even ultralow frequency, and puts forward a new solution for designing ultralow frequency antenna in the future.

BRIEF DESCRIPTION OF THE DRAWINGS

In order to more clearly explain the embodiments of the present application or the technical solutions in the prior art, the figures needed in the embodiments will be briefly introduced below. Obviously, the figures in the following description are only some embodiments of the present application, and for ordinary technicians in the field, other figures could be obtained according to these figures without creative efforts.

DETAILED DESCRIPTION OF THE EMBODIMENTS

Next, the technical solutions in the embodiments of the present application will be clearly and completely described with reference to the figures in the embodiments of the present application. Obviously, the described embodiments are only part of the embodiments of the present application, not all of them. Based on the embodiments in the present application, all other embodiments obtained by ordinary technicians in the field without creative work are within the scope of the present application.

In order to make the above-mentioned objectives, features and advantages of the present application more obvious and easier to understand, the present application will be described in further detail below with reference to the figures and detailed description.

With the development of new materials and technologies, the chip design of very low frequency antenna has become a hot research topic at present, which can not only improve the efficiency of antenna and realize light and small design, but also integrate with the current wireless communication equipment, individual soldier equipment, underwater equipment and aerospace equipment, and at the same time meet the air-water communication requirements.

Figure 1:
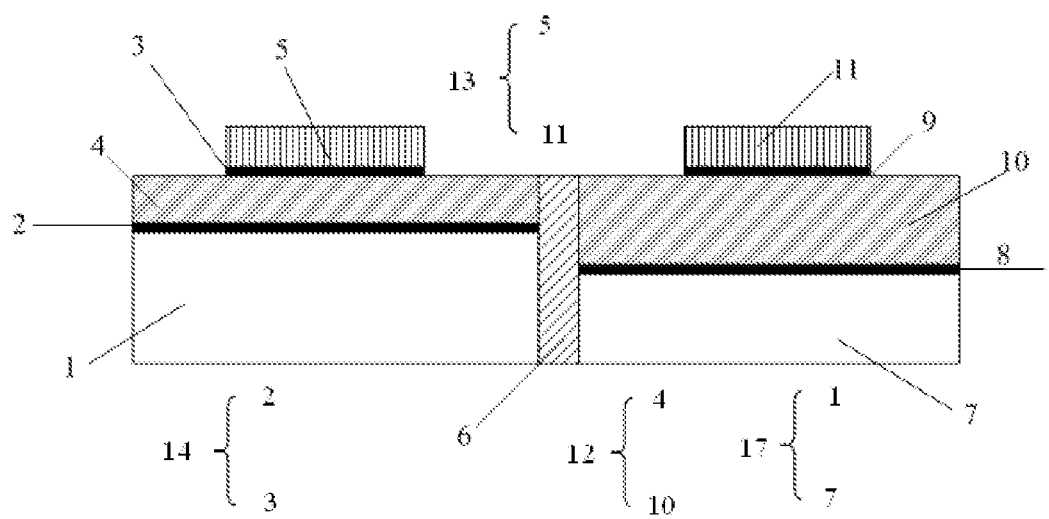
FIG. 1 is a front view of a dual-band very low frequency antenna according to an embodiment of the present application.

As shown in FIG. 1, the present application provides a dual-band very low frequency antenna, including:

positive and negative electrodes, silicon substrates, piezoelectric material units, stress-electromagnetic conversion material units and an insulator;

the piezoelectric material units are arranged between the positive and negative electrodes;

the stress-electromagnetic conversion material units and the silicon substrates are respectively arranged at both ends of the positive and negative electrodes;

the positive and negative electrodes are used for driving the piezoelectric material unit;

the piezoelectric material units are used for generating flutter and conducting the flutter to the stress-electromagnetic conversion material units;

the stress-electromagnetic conversion material units are used for converting vibration waves generated by flutter into electromagnetic wave radiation.

The positive and negative electrodes include a first positive and negative electrodes and a second positive and negative electrodes;

the silicon substrates include a first silicon substrate and a second silicon substrate;

the piezoelectric material units include a first piezoelectric material unit and a second piezoelectric material unit;

the stress-electromagnetic conversion material units include a first stress-electromagnetic conversion material unit and a second stress-electromagnetic conversion material unit;

the insulator is arranged between the first silicon substrate, the first positive and negative electrodes, the first piezoelectric material unit and the second silicon substrate, the second positive and negative electrodes and the second piezoelectric material unit.

The positive electrodes of the first positive and negative electrodes and the second positive and negative electrodes are connected with the positive electrode of the power supply and have the same voltage;

the negative electrodes of the first positive and negative electrodes and the second positive and negative electrodes are connected with the negative electrode of the power supply.

The positive electrodes of the first positive electrode and the positive electrode of the second positive electrode are in the same plane, while the negative electrode is not in the same plane.

The thickness of the first piezoelectric material unit is different from that of the second piezoelectric material unit.

The first piezoelectric material unit and the second piezoelectric material unit are piezoelectric material unit sheets with different thicknesses, and shapes of the piezoelectric material unit sheets are one of rectangle, circle and polygon.

The dual-band very low frequency antenna realizes resonance at different frequencies by adjusting the thicknesses of the piezoelectric material units and controlling voltages of the positive and negative electrodes, and generates dual-band characteristics.

Embodiment 1

Further, the dual-band very low frequency antenna provided by the present application includes positive and negative electrodes 16 (2 and 3 are a pair of positive and negative electrodes, 8 and 9 are a pair of positive and negative electrodes), piezoelectric material units 12, insulator 6, silicon substrates 17, and stress-electromagnetic conversion material units 13, where the positive electrodes 3 and 9 of the two pairs of positive and negative electrodes are connected with the positive electrodes of the power supply; the negative electrodes are connected with the negative electrode of the power supply. The negative electrodes of first positive and negative electrodes 14 and second positive and negative electrodes 15 are not in the same plane, but their positive electrodes are in the same plane (in first positive and negative electrodes 14, 3 is the positive electrode and 2 is the negative electrode; in second positive and negative electrodes 15, 9 is the positive electrode and 8 is the negative electrode). The piezoelectric material unit 10 between the second positive and negative electrodes 15 is thicker than the piezoelectric material unit 4 between the first positive and negative electrodes 14, and the size of the stress-electromagnetic conversion material units connected between them is the same. By applying a voltage to two pairs of positive and negative electrodes pairs, the piezoelectric material unit layer flutters under the drive of the voltage, and the flutter amplitude is transmitted to the stress-electromagnetic conversion material units 5 and 11, which causes the change of the stress-electromagnetic conversion material units 13 and converts the vibration waves into electromagnetic waves. By controlling the thicknesses of piezoelectric material units and the voltages of two pairs of positive and negative electrodes, the resonance of different frequencies can be realized, and the dual-band low-frequency antenna can work at different resonant frequencies.

The applied voltages of the two pairs of positive and negative electrodes are the same, but the thicknesses of piezoelectric material units are different, and the insulator 6 is used to separate the two piezoelectric material units and the silicon substrates to realize dual-band independent design.

The dual-band very low frequency antenna drives two piezoelectric material units by two mutually connected positive and negative electrodes, and transmits the flutter of the piezoelectric material units to the stress-electromagnetic conversion material unit to generate electromagnetic wave radiation, to realize the design of the dual-band very low frequency antenna.

The piezoelectric material units of the dual-band very low frequency antenna are two different piezoelectric material unit sheets, and the thicknesses of the two piezoelectric material unit sheets are different, and the two piezoelectric material unit sheets are rectangular in structure, and can be designed into circular, polygonal and other structures according to actual requirements. By controlling the voltages of two pairs of electrodes and the thicknesses of the piezoelectric material unit sheets, the frequency of flutter is controlled, and then the resonant frequency of the very low frequency antenna is regulated and controlled, and the dual-band resonance is controlled to achieve the required dual-band.

The two pairs of positive and negative electrodes of the dual-band very low frequency antenna can be controlled by a direct current voltage source, and the voltages of the two electrodes are consistent, and two piezoelectric material unit sheets with different thicknesses are simultaneously excited, so that the resonances of two different frequencies are realized, so as to realize the objective of dual-band very low frequency antenna design.

The dual-band very low frequency antenna can control the frequency and amplitude of flutter of piezoelectric material units by controlling the voltage, the thickness of piezoelectric material unit sheet, the characteristics and parameters of piezoelectric material unit sheet, and conduct the flutter to the stress-electromagnetic conversion material unit to realize the design of dual-band very low frequency antenna.

According to the application, the conversion principle of voltage-stress-electromagnetic field and the isolation design method of the antenna are adopted to design a dual-band or even multi-band very low frequency antenna or an ultra-low frequency antenna, so that the conventional antenna design is replaced, the size of the antenna is reduced, and the maneuverability and flexibility of the antenna are improved. In addition, the involved dual-band very low frequency antenna is completely different from the conventional very low frequency antenna in method and mechanism. The resonant frequency of the antenna is mainly adjusted by the change of voltage and the thickness of piezoelectric material unit, which provides a new design method for the regulation, multi-band design and flexible design of very low frequency antenna.

Embodiment 2

In order to realize the dual-band design of very low frequency antenna, the dual-band very low frequency antenna provided by the present application is consisted of positive and negative electrodes 16 (2 and 3 are a pair of positive and negative electrodes, 8 and 9 are a pair of positive and negative electrodes), piezoelectric material units 12 and 10, insulator 6, silicon substrates 17, and stress-electromagnetic conversion material units 13. The design of dual-band very low frequency antenna is realized through the interaction between the two pairs of positive and negative electrodes, piezoelectric material units and stress-electromagnetic conversion material units. The positive electrode of the two pairs of positive and negative electrodes of the application is connected with the positive electrode of the power supply, and the negative electrode is connected with the negative electrode of the power supply. The negative electrodes of first positive and negative electrodes 14 and second positive and negative electrodes 15 are not in the same plane, but their positive electrodes are in the same plane (in the first positive and negative electrodes 14, 3 is first positive electrode and 2 is first negative electrode; in the second positive and negative electrode 15, 9 is first positive electrode and 8 is first negative electrode). The piezoelectric material unit 10 between second positive and negative electrodes 15 is thicker than the piezoelectric material unit 4 between first positive and negative electrodes 14, and the size of the stress-electromagnetic conversion material units connected between them is the same. By applying voltage to two pairs of positive and negative electrodes pairs, driven by voltage, the piezoelectric material unit layer flutters, and the flutter energy, amplitude and frequency are transmitted to the stress-electromagnetic conversion material units 13, which causes the change of the stress-electromagnetic conversion material units, and converts the flutter of the piezoelectric material units into electromagnetic waves for radiation. Because of the change of voltage and the difference of thicknesses between the two piezoelectric material units, two resonant frequencies are formed, thus realizing the design of dual-band very low frequency antenna.

Figure 2:
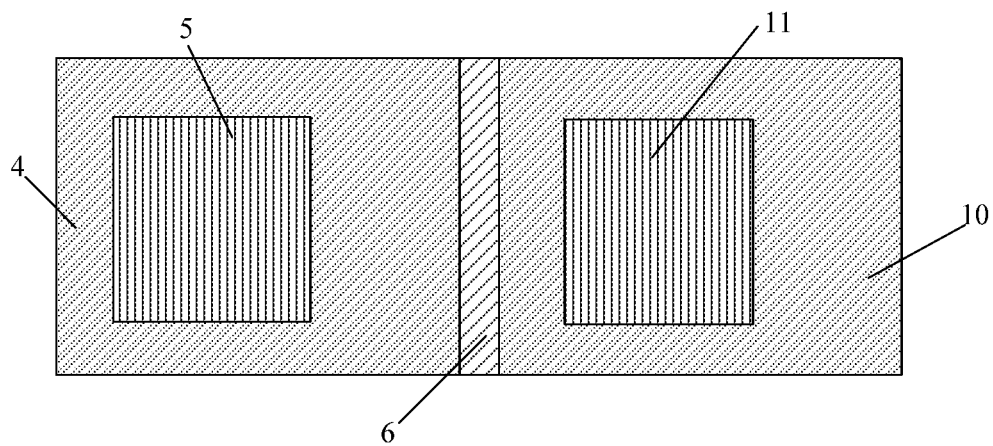
FIG. 2 is a top view of a dual-band very low frequency antenna according to an embodiment of the present application.
Figure 3:
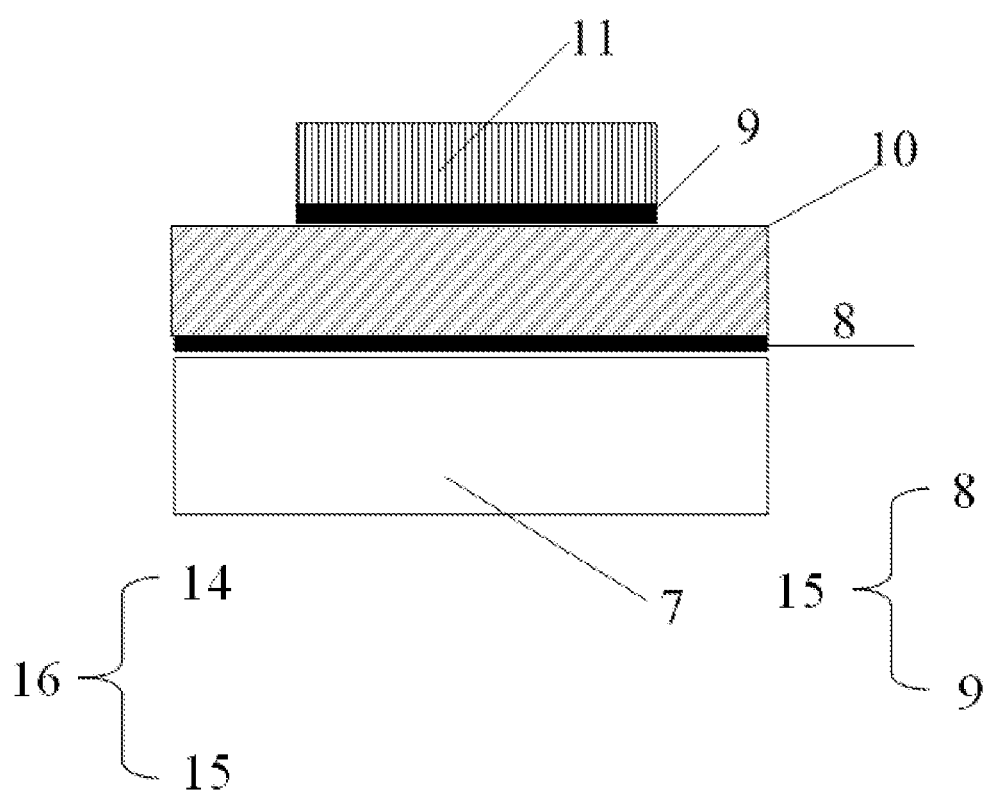
FIG. 3 is a side view of a dual-band very low frequency antenna according to an embodiment of the present application.

As shown in FIGS. 1-3, the dual-band very low frequency antenna includes positive and negative electrodes 16, piezoelectric material units 4 and 10, insulator 6, silicon substrates 17, and stress-electromagnetic conversion material units 13. Through the two pairs of positive and negative electrodes, piezoelectric material units and stress-electromagnetic conversion material units, the negative electrodes of first positive and negative electrodes 14 and 15 are not in the same plane, and their positive electrodes are in the same plane. The piezoelectric material unit between second positive and negative electrodes 15 is thicker than that between first positive and negative electrodes 14, and the stress-electromagnetic conversion material units connected with positive and negative electrodes pairs 1 and 2 have the same size. The two pairs of positive and negative electrodes are driven by voltage, and when voltage is applied, piezoelectric material unit 4 and piezoelectric material unit 10 flutter, and the frequency and amplitude of their flutter are different. Then, the piezoelectric material unit 4 and the piezoelectric material unit 10 transmit the frequency and energy of the flutter to the stress-electromagnetic conversion material unit, which converts the flutter into electromagnetic waves of the same frequency for radiation. The silicon substrate of the application is mainly used as a substrate to support two pairs of positive and negative electrodes, piezoelectric material unit 4, piezoelectric material unit 10 and stress-electromagnetic conversion material unit. The insulator mainly isolates the two pairs of positive and negative electrodes, piezoelectric material units 4, piezoelectric material units 10, stress-electromagnetic conversion material units and silicon substrates, reduces the influence between piezoelectric material units 4 and piezoelectric material units 10, and realizes the independent design of two resonant frequencies points of dual-band very low frequency antenna. The size of the antenna is in the micron order, and the size of the antenna is greatly reduced.

The application realizes the design of dual-band very low frequency antenna by adopting piezoelectric material unit, stress-electromagnetic conversion material unit, insulator and silicon substrate and voltage-driven mode. As the voltage drives the piezoelectric material unit, it can control the voltage, adjust the resonance mode and frequency of the piezoelectric material unit, and realize the free and flexible design of dual-band. The antenna works in the very low frequency band. At the same frequency, the size of the designed dual-band very low frequency antenna is much smaller than the traditional very low frequency antenna. The designed dual-band very low frequency antenna can realize air-water communication and detection, and can be installed on underwater mobile equipment, frogman backpack, single soldier backpack, airplane, satellite and other equipment to realize flexible deployment and seamless interconnection of land, sea, air and space.

The above-mentioned embodiments only describe the preferred mode of the present application, and do not limit the scope of the present application. Without departing from the design spirit of the present application, all kinds of modifications and improvements made by ordinary technicians in the field to the technical scheme of the present application should fall within the protection scope determined by the claims of the present application.

What is claimed is:

1. A dual-band very low frequency antenna, comprising:
    positive and negative electrodes, silicon substrates, piezoelectric material units, stress-electromagnetic conversion material units and an insulator;
    wherein the piezoelectric material units are arranged between the positive and negative electrodes;
    the stress-electromagnetic conversion material units and the silicon substrates are respectively arranged at both ends of the positive and negative electrodes;
    the positive and negative electrodes are used for driving the piezoelectric material units;
    the piezoelectric material units are used for generating flutter and conducting the flutter to the stress-electromagnetic conversion material units; and
    the stress-electromagnetic conversion material units are used for converting vibration waves generated by the flutter into electromagnetic wave radiation.

2. The dual-band very low frequency antenna according to claim 1,
    wherein the positive and negative electrodes comprise a first positive and negative electrodes and a second positive and negative electrodes;
    the silicon substrates comprise a first silicon substrate and a second silicon substrate;
    the piezoelectric material units comprise a first piezoelectric material unit and a second piezoelectric material unit;
    the stress-electromagnetic conversion material units comprise a first stress-electromagnetic conversion material unit and a second stress-electromagnetic conversion material unit; and
    the insulator is arranged between the first silicon substrate, the first positive and negative electrodes, the first piezoelectric material unit and the second silicon substrate, the second positive and negative electrodes and the second piezoelectric material unit.

3. The dual-band very low frequency antenna according to claim 2, wherein positive electrodes of the first positive and negative electrodes and the second positive and negative electrodes are connected with the positive electrode of the power supply and have the same voltage; and
    the negative electrodes of the first positive and negative electrodes and the second positive and negative electrodes are connected with the negative electrode of the power supply.

4. The dual-band very low frequency antenna according to claim 2, wherein,
    positive electrodes of the first positive and negative electrodes and the second positive and negative electrodes are in a same plane, and negative electrodes of the first positive and negative electrodes and the second positive and negative electrodes are not in a same plane.

5. The dual-band very low frequency antenna according to claim 2, wherein a thickness of the first piezoelectric material unit is different from that of the second piezoelectric material unit.

6. The dual-band very low frequency antenna according to claim 2, wherein the first piezoelectric material unit and the second piezoelectric material unit are piezoelectric material unit sheets with different thicknesses, and shapes of the piezoelectric material unit sheets are one of rectangle, circle and polygon.

* * * * *